United States Patent
Xue et al.

(10) Patent No.: US 9,451,604 B2
(45) Date of Patent: Sep. 20, 2016

(54) SIGNALING AND CHANNEL DESIGNS FOR D2D COMMUNICATIONS

(71) Applicant: Intel Corporation, Santa Clara, CA (US)

(72) Inventors: Feng Xue, Redwood City, CA (US); Qinghua Li, San Ramon, CA (US); Huaning Niu, Milpitas, CA (US); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 14/125,973

(22) PCT Filed: Aug. 2, 2013

(86) PCT No.: PCT/US2013/053420
§ 371 (c)(1),
(2) Date: Dec. 13, 2013

(87) PCT Pub. No.: WO2014/022769
PCT Pub. Date: Feb. 6, 2014

(65) Prior Publication Data
US 2015/0049732 A1 Feb. 19, 2015

Related U.S. Application Data

(60) Provisional application No. 61/679,627, filed on Aug. 3, 2012, provisional application No. 61/748,706, filed on Jan. 3, 2013.

(51) Int. Cl.
*H04W 72/04* (2009.01)
*H04L 1/18* (2006.01)
*H04W 76/02* (2009.01)

(52) U.S. Cl.
CPC .......... *H04W 72/042* (2013.01); *H04L 1/1854* (2013.01); *H04L 1/1861* (2013.01);
(Continued)

(58) Field of Classification Search
None
See application file for complete search history.

(56) References Cited

U.S. PATENT DOCUMENTS

| 8,155,102 B1 | 4/2012 | Hakola et al. |
| 8,213,360 B2 | 7/2012 | Koskela et al. |

(Continued)

FOREIGN PATENT DOCUMENTS

| CN | 104429141 A | 3/2015 |
| CN | 104471876 A | 3/2015 |

(Continued)

OTHER PUBLICATIONS

"U.S. Appl. No. 14/126,983, Non Final Office Action mailed Jun. 3, 2015", 10 pgs.

(Continued)

*Primary Examiner* — Chirag Shah
*Assistant Examiner* — Rina Pancholi
(74) *Attorney, Agent, or Firm* — Schwegman Lundberg & Woessner, P.A.

(57) ABSTRACT

Described are methods and devices for enabling D2D communications with signal structures that require minimal changes to the current LTE architecture. In the embodiments described, the eNB grants resources to UEs for D2D communication and either initiates or permits a pair of UEs to establish a D2D link. Certain embodiments are designed to minimize changes to the current LTE control signaling structure by having the control signaling always come from the eNB as in a normal cellular link so that the transmitting UE transmits over a data channel (e.g., PUSCH/PDSCH) that the receiving UE is able to decode.

20 Claims, 4 Drawing Sheets

(52) U.S. Cl.
CPC .......... *H04L1/1887* (2013.01); *H04W 72/044* (2013.01); *H04W 72/0413* (2013.01); *H04W 76/023* (2013.01)

(56) References Cited

U.S. PATENT DOCUMENTS

| | | | |
|---|---|---|---|
| 8,359,038 B2 | 1/2013 | Hakola et al. | |
| 8,447,315 B2 | 5/2013 | Hakola et al. | |
| 8,520,575 B2 | 8/2013 | Doppler et al. | |
| 8,577,363 B2 | 11/2013 | Wijting et al. | |
| 8,588,690 B2 | 11/2013 | Turtinen et al. | |
| 8,588,803 B2 | 11/2013 | Hakola et al. | |
| 8,761,099 B2 | 6/2014 | Charbit et al. | |
| 2007/0129076 A1 | 6/2007 | Cho et al. | |
| 2009/0016232 A1 | 1/2009 | Kwon et al. | |
| 2010/0009675 A1 | 1/2010 | Wijting et al. | |
| 2010/0009690 A1 | 1/2010 | Jin et al. | |
| 2011/0029834 A1* | 2/2011 | Yang .................... | H04L 1/1877 714/749 |
| 2011/0268006 A1 | 11/2011 | Koskela et al. | |
| 2012/0057476 A1 | 3/2012 | Chan et al. | |
| 2012/0093098 A1* | 4/2012 | Charbit ................ | H04W 72/04 370/329 |
| 2012/0106517 A1 | 5/2012 | Charbit et al. | |
| 2012/0134344 A1* | 5/2012 | Yu ........................ | H04W 72/14 370/336 |
| 2012/0147815 A1* | 6/2012 | Meyer ................... | H04B 7/022 370/328 |
| 2013/0223352 A1 | 8/2013 | Sartori et al. | |
| 2013/0223356 A1* | 8/2013 | Khoshnevis ........ | H04W 72/042 370/329 |
| 2015/0139197 A1 | 5/2015 | He et al. | |
| 2015/0181564 A1 | 6/2015 | Rao et al. | |

FOREIGN PATENT DOCUMENTS

| | | |
|---|---|---|
| EP | 2880782 A | 6/2015 |
| EP | 2880943 A1 | 6/2015 |
| EP | 2880955 A | 6/2015 |
| KR | 1020110086758 A | 7/2011 |
| KR | 1020120070444 A | 6/2012 |
| KR | 1020120074251 A | 7/2012 |
| KR | 1020120074255 A | 7/2012 |
| WO | WO-2012056209 A1 | 5/2012 |
| WO | WO-2012068731 A1 | 5/2012 |
| WO | WO-2012091420 A2 | 7/2012 |
| WO | WO-2014022769 A1 | 2/2014 |
| WO | WO-2014022776 A1 | 2/2014 |
| WO | WO-2014022797 A1 | 2/2014 |

OTHER PUBLICATIONS

"U.S. Appl. No. 14/126,983, Response filed Sep. 3, 2015 to Non Final Office Action mailed Jun. 3, 2015", 9 pgs.

"International Application Serial No. PCT/US2013/053420, International Preliminary Report on Patentability mailed Feb. 12, 2015", 6 pgs.

"International Application Serial No. PCT/US2013/053428, International Preliminary Report on Patentability mailed Feb. 12, 2015", 10 pgs.

"International Application Serial No. PCT/US2013/053470, International Preliminary Report on Patentability mailed Feb. 12, 2015", 6 pgs.

"U.S. Appl. No. 14/124,984, Preliminary Amendment filed Dec. 9, 2013", 11 pgs.

"U.S. Appl. No. 14/126,983, Preliminary Amendment filed Dec. 17, 2013", 8 pgs.

"Evolved Universal Terrestrial Radio Access (E-UTRA); Radio Resource Control (RRC); Protocol specification", 3GPP TS 36.331 V11.5.0. Technical Specification Group Radio Access Network. Release 11., (Sep. 2013), 347 pgs.

"International Serial No. PCT/US2013/053420, International Search Report mailed Dec. 2, 2013", 3 pgs.

"International Application Serial No. PCT/US2013/053420, Written Opinion mailed Dec. 2, 2013", 4 pgs.

"International Application Serial No. PCT/US2013/053428, International Search Report mailed Dec. 19, 2013", 4 pgs.

"International Application Serial No. PCT/US2013/053428, Written Opinion mailed Dec. 19, 2013", 8 pgs.

"International Application Serial No. PCT/US2013/053470, International Search Report mailed Nov. 21, 2013", 3 pgs.

"International Application Serial No. PCT/US2013/053470, Written Opinion mailed Nov. 21, 2013", 4 pgs.

Ericson, Juniper, et al., "Device triggering procedure", 3GPP TSG-CT WG3 Meeting #69. C3-120956., [Online] retrieved from the internet: <http://v9ww.3gpp.org/ftp/tsg_ct/WG3_interworking_ex-CN3/TSGC3_69JKyoto/Docs/>, (May 21, 2012), 4 pgs.

\* cited by examiner

SIGNALING AND CHANNEL DESIGNS FOR D2D COMMUNICATIONS

This application is a U.S. National stage application Under 35. U.S.C. 371 from International Application No. PCT/US2013/053420, filed Aug. 2, 2013, which claims the benefit of priority to U.S.Provisional Patent Application Ser. No. 61/679,627, filed on Aug. 3, 2012, and to U.S. Provisional Patent Application Ser. No. 61/748,706, filed on Jan. 3, 2013, which are incorporated herein by reference in their entireties.

BACKGROUND

Device-to-device (D2D) communications is one means for improving the performance of LTE (Long Term Evolution) and other cellular networks. In D2D communications, terminals (referred to as user equipments or UEs in LTE) communicate with one another directly rather than being linked through the base station (referred to as an evolved node B or eNB in LTE). D2D communication between two or more D2D devices is typically very local, due to the short distance between D2D devices and uses very lower transmit power. D2D communications is also a powerful way to increase spatial reuse in cellular systems for higher throughput.

One approach to D2D communications as an underlay to an LTE network infrastructure is an out-of-band solution, in which the D2D traffic is unloaded to an unlicensed band (e.g., Wi-Fi as defined by the IEEE 802.11 standards) on the application layer. Another approach is an in-band solution, in which the D2D transmissions take place in the same licensed band used by the LTE network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

D2D communications as an underlay to an LTE network may be implemented as either a centralized or a distributed system. In the latter case, UEs acting as D2D devices communicate directly without any eNB involvement. Such a distributed architecture is only appropriate where the D2D communication is out-of-band, using resources other than the licensed spectrum. When D2D communication takes place in the same licensed band as LTE cellular communications, a centralized system is necessary where the eNB retains control of the radio resource. That is, the eNB is responsible for permitting D2D communications between UEs to take place and for allocating the time-frequency resources used in the D2D links.

Described herein are methods and devices for enabling D2D communications with signal structures that require minimal changes to the current LTE architecture. In the embodiments described below, the eNB grants resources to UEs for D2D communication and either initiates or permits a pair of UEs to establish a D2D link. For example, the eNB may monitor its connected UEs for their suitability in forming a D2D pair. When the eNB notices that two UEs are suitable for D2D communications, it allocates resources (time-frequency) and initiates the D2D transmission between the UE's via control channels. Certain embodiments are designed to minimize changes to the current LTE control signaling structure by having the control signaling always come from the eNB as in a normal cellular link so that the transmitting UE transmits over a data channel (e.g., PUSCH/PDSCH) that the receiving UE is able to decode. Other embodiments allow more control of the D2D communications to be between the members of a D2D pair such that the major role of the eNB is to reserve particular resources for D2D communications and notify the UE pairs of those resources. Once D2D communication starts, much of the control signaling may then occur between the members of a D2D pair directly.

System Description

Figure 1:
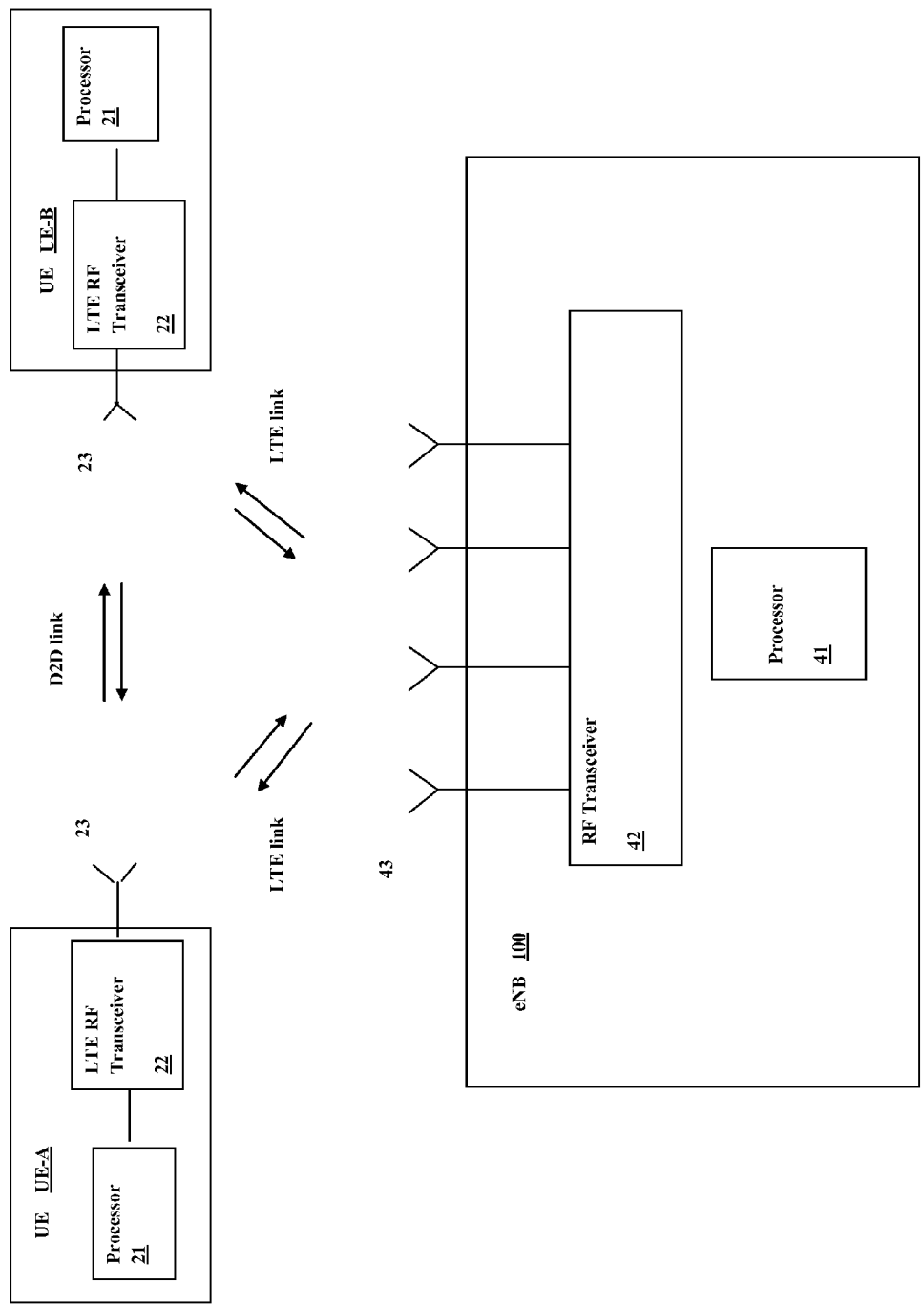
FIG. 1 shows example UE devices for D2D communications and an eNB.

FIG. 1 shows an example of user equipments UE-A and UE-B each of which incorporates a processor 21 interfaced to a radio-frequency (RF) transceiving circuitry 22 that is connected to one or more antennas 23. A base station or eNB 100 is shown with a processor 41 interfaced to an RF transceiving circuitry 42 that is connected to a plurality of antennas 43. The illustrated components are intended to represent any type of hardware/software configuration for providing an air interfaces for both LTE and D2D communication and for performing the processing functions as described herein. In the embodiment shown in the figure, UEs UE-A and UE-B both communicate with the eNB 100 via LTE links and with one another via D2D link.

In the embodiments described below, D2D communications takes place using LTE physical resources as allocated by the eNB. The physical layer of LTE is based upon orthogonal frequency division multiplexing (OFDM) for the downlink and a related technique, single carrier frequency division multiplexing (SC-FDM), for the uplink. In OFDM/SC-FDM, complex modulation symbols according to a modulation scheme such as QAM (quadrature amplitude modulation) are each individually mapped to a particular OFDM/SC-FDM subcarrier transmitted during an OFDM/SC-FDM symbol, referred to as a resource element (RE). An RE is the smallest time-frequency resource in LTE. LTE transmissions in the time domain are organized into radio frames, each having a duration of 10 ms. Each radio frame consists of 10 sub-frames, and each sub-frame consists of two consecutive 0.5 ms slots.

A physical channel corresponds to the set of time-frequency resources used for transmission of a particular transport channel, and each transport channel is mapped to a corresponding physical channel. The primary transport channels used for the transmission of data, the uplink shared channel (UL-SCH) and downlink shared channel (DL-SCH), are mapped to the physical uplink shared channel (PUSCH) and physical downlink shared channel (PDSCH), respectively, at the physical layer. There are also physical control channels without a corresponding transport channel that are needed for supporting the transmission of the downlink and uplink transport channels. These include the physical downlink control channel (PDCCH), by which the eNB transmits downlink control information (DCI) to the UE, and the physical uplink control channel (PUCCH) that carries uplink control information (UCI) from the UE to the eNB. Insofar as is relevant to the present disclosure, the DCI carried by the PDCCH may include scheduling information that allocates uplink and downlink resources to the UE and a NewData bit that indicates whether new or previously transmitted data should be transmitted on the allocated resource, while the UCI carried by the PUCCH may include HARQ acknowledgements (explained below) for responding to transport blocks received by the UE.

D2D communications may also use LTE control signaling for error detection and correction. LTE uses a combination of forward error-correction coding and ARQ (automatic repeat request), referred to as hybrid ARQ or HARQ. HARQ uses forward error correction codes to correct some errors. When uncorrected errors are detected, the corrupted transmissions are discarded and the receiver requests retransmission. As the term is used herein, a HARQ acknowledgement may either be a negative acknowledgement (NACK), signifying that a transmission error has occurred and that a retransmission is requested, or a positive acknowledgement (ACK) indicating that the transmission was received correctly. Data and control signaling is organized into transport blocks by the medium access control (MAC) protocol layer of LTE. It is with respect to transport blocks that HARQ processes are executed by the MAC layer.

D2D Communications

Figure 2:
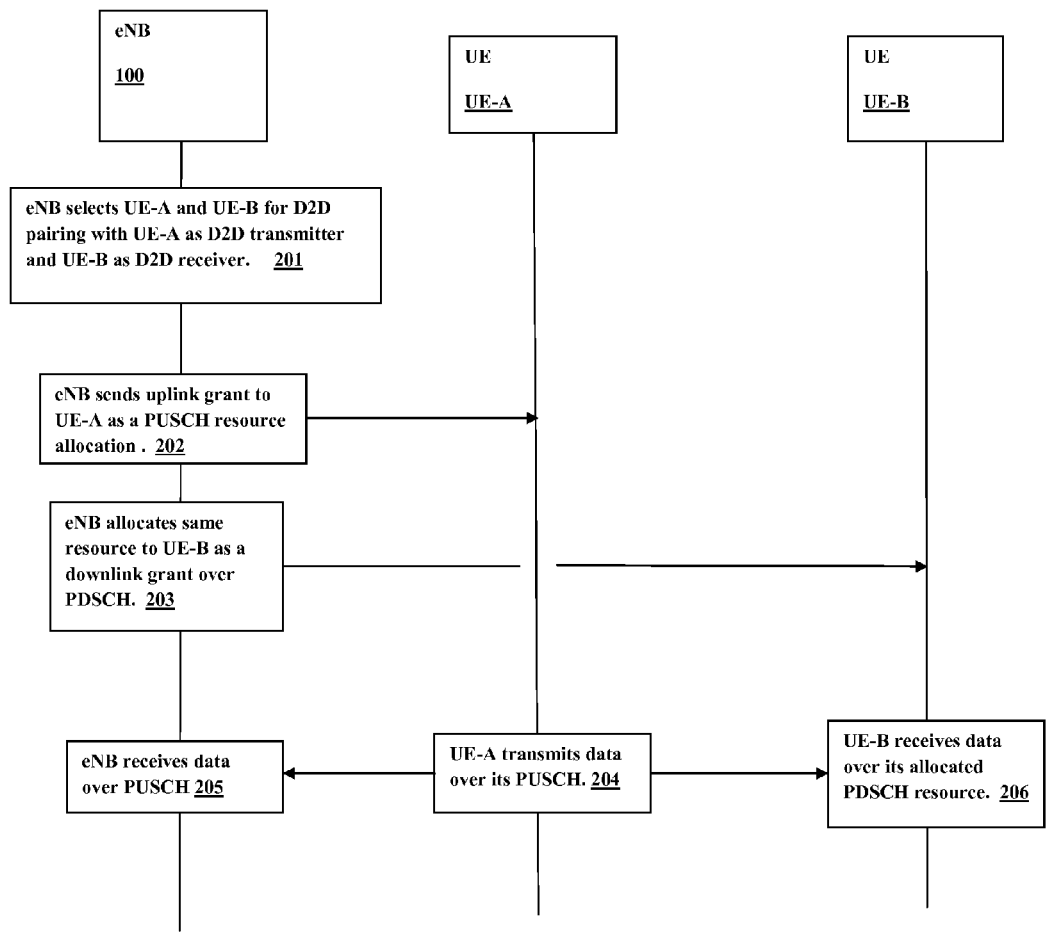
FIG. 2 illustrates an example scheme as executed by an eNB and two UEs to set up D2D communications.

In one embodiment, D2D communications between UEs UE-A and UE-B are initiated by the eNB directing UE-A via the control channel (PDCCH) to transmit on its PUSCH, using a cell-specific RNTI (Radio Network Temporary Identity) or a special RNTI for scrambling. The eNB also directs UE-B via the PDCCH to listen to a PDSCH, which is in reality UE-A's PUSCH, and informs UE-B about UE-A's scrambling sequence so that UE-B can decode the received data channel (i.e., UE-A's PUSCH and UE-B's PDSCH). For example, in the situation where the scrambling sequence is based upon UE-A's RNTI (radio network temporary identity), UE-A's RNTI may be transmitted to UE-B via control signaling such as via the PDCCH. FIG. 2 illustrates an example scheme as executed by the eNB and UEs UE-A and UE-B. At stage 201, the eNB selects UE-A and UE-B for D2D pairing with UE-A as D2D transmitter and UE-B as D2D receiver. At stage 202, the eNB sends an uplink grant to UE-A as a PUSCH resource allocation for use in transmitting data to UE-B. This signaling is over the PDCCH. At stage 203, the eNB allocates same time-frequency resource to UE-B as a downlink grant of a PDSCH allocation. This signaling is also over the PDCCH. At stage 204, UE-A transmits data over its allocated PUSCH. The eNB receives the data over the PUSCH at stage 205, and UE-B receives the data over its allocated PDSCH at stage 206. In different embodiments, the eNB may or may not need to try to decode the data transmitted by UE-A. In order to maintain the HARQ timeline with minimal change to the current LTE standard, in which the round trip time for a HARQ process is 8 ms, two possible options are described below.

One mechanism for maintaining the HARQ timeline is as follows. Both the eNB and UE-B try to decode the data channel after UE-A transmits over its PUSCH. After the data transmission, the eNB sends its ACK/NACK to UE-A in the PHICH based on its own reception without toggling the NewData bit in the PDCCH after a delay (e.g., 4 ms later) to keep up with the timeline. UE-B sends its ACK/NACK (e.g., 4 ms later) to the eNB in its PUCCH based upon the results of decoding its PDSCH. UE-A then proceeds with its HARQ process based on the eNB's ACK/NACK transmitted to it by: 1) if a NACK is received, preparing to resend the data, or 2) if an ACK is received but without a toggled NewData bit in the PDCCH, not flushing the transmission buffer (which holds the data previously transmitted) and awaiting further instructions from the eNB. After receiving UE-B's ACK/NACK over the PUCCH, the eNB compares it with its own ACK/NACK for the same data. If they agree, then the eNB sends control signals (i.e., PUSCH and PDSCH allocations) to the UEs for the next data channel. If the eNB's ACK/NACK is a NACK but UE-B's ACK/NACK is an ACK, then UE-A just retransmits the old data. If the eNB's ACK/NACK is an ACK but UE-B's ACK/NACK is a NACK, then the eNB sends control signaling (i.e., a PUSCH allocation) to UE-A with the NewData bit not toggled to let UE-A know that the previous data needs to be retransmitted.

Figure 3:
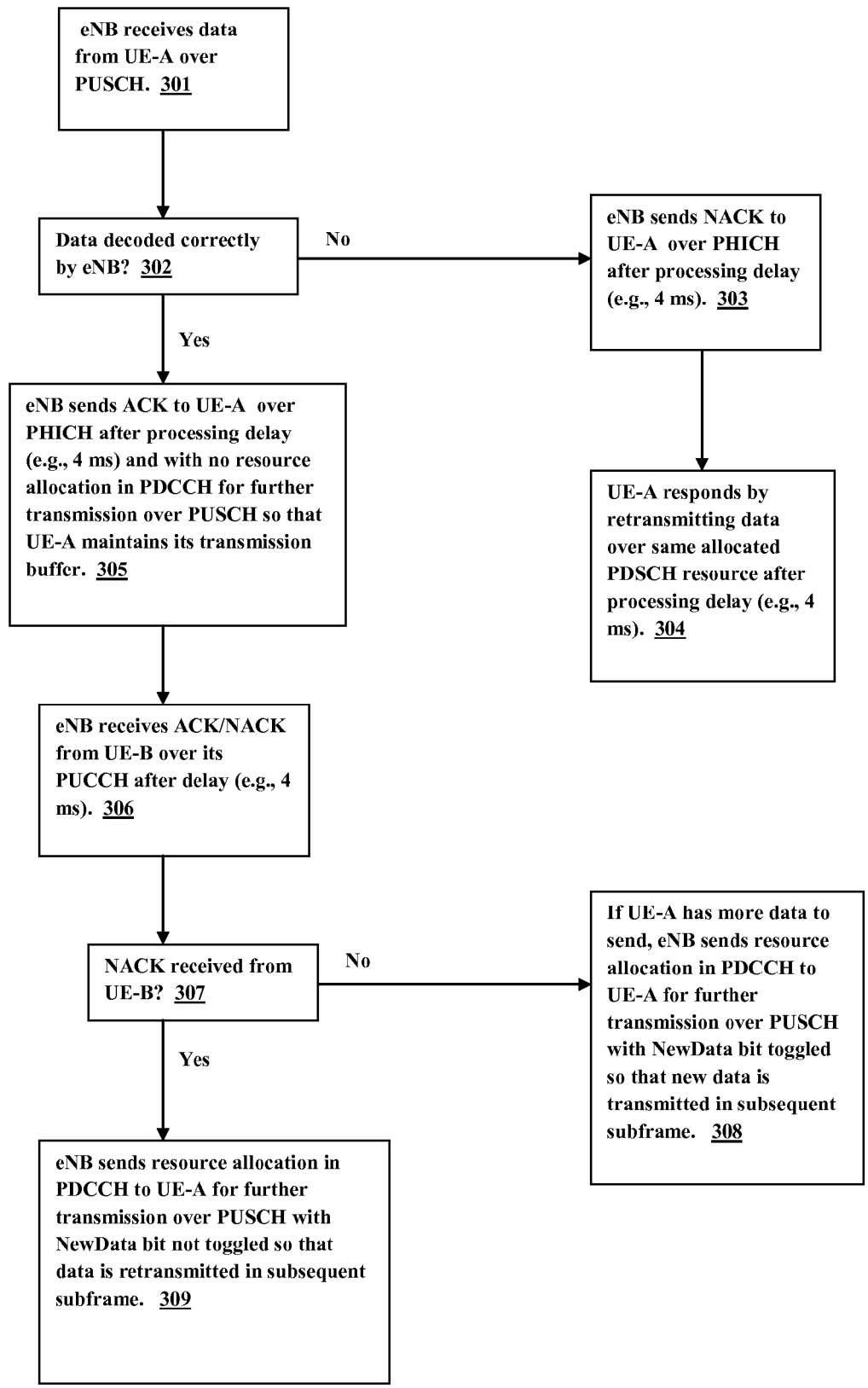
FIG. 3 illustrates an example scheme for implementing a HARQ process during D2D communications.

FIG. 3 illustrates an example scheme as executed by the eNB and UEs UE-A and UE-B. At stage 301, eNB receives data from UE-A over the PUSCH as described above. At stage 302, the received data is decoded. If the data is not decoded correctly, the eNB sends a NACK to UE-A over the PHICH after a processing delay (e.g., 4 ms or 4 sub-frames later). This signaling is not accompanied by any further uplink resource grant to UE-A for this particular HARQ process. UE-A therefore responds by retransmitting data over the same allocated PDSCH resource after a processing delay (e.g., 4 ms or 4 sub-frames later) at stage 304. If it turns out that UE-B decoded the data correctly and transmitted an ACK over its PUCCH, UE-B merely receives the data again in the subsequent sub-frame with no adverse consequences. If the eNB does decode the data received from UE-A correctly, the eNB sends an ACK to UE-A over the PHICH after a processing delay (e.g., 4 ms or 4 sub-frames later) and with no resource allocation in the PDCCH for further transmission over PUSCH for this HARQ process at stage 305. UE-A therefore does not flush its transmission buffer and awaits another uplink grant before transmitting any further data for this HARQ process. The eNB also receives the ACK/NACK from UE-B over its PUCCH after a delay (e.g., 4 ms) at stage 306. At stage 307, the eNB determines whether an ACK or a NACK was sent by UE-B. If UE-B has transmitted an ACK and if UE-A has more data to send, the eNB sends resource allocation in PDCCH to UE-A for further transmission over the PUSCH with the NewData bit toggled so that new data is transmitted in a subsequent subframe. If UE-B has transmitted a NACK, the eNB sends an uplink resource allocation over the PDCCH at stage 309 to UE-A for further transmission over the PUSCH with the NewData bit not toggled so that the data is retransmitted in a subsequent subframe.

Another option for maintaining the HARQ timeline involves the eNB speeding up the handling/forwarding of an ACK/NACK. In current LTE specifications, typically a 4 ms processing delay is assumed from decoding received data to sending out an ACK/NACK in response. In this alternative, because ACK/NACKs are encoded in a very simple format, ACK/NACK handling may be accelerated as follows. UE-B listens to UE-A's transmission. After each HARQ transmission, UE-B sends out its ACK/NAK several ms (e.g., 4 ms) later in its PUCCH to the eNB according to current standard operations. The eNB accelerates its usual handing and fast-forwards this ACK/NAK to UE-A on its channel for conveying ACK/NACK (e.g., the PHICH). UE-A may also speeds up its decoding of the ACK/NACK in order to satisfy the round trip requirement of the HARQ timeline. For example, assume that UE-A sends out PUSCH at time t. Then, at time t+4 ms, UE-B sends out its ACK/NACK. The eNB accelerates its handling of this ACK/NACK and forwards the ACK/NACK to UE-A at time t+4+x ms, where x could be, for example, from 1 to 3 ms. UE-A will then be able to decide its next HARQ stage just in time.

Figure 4:
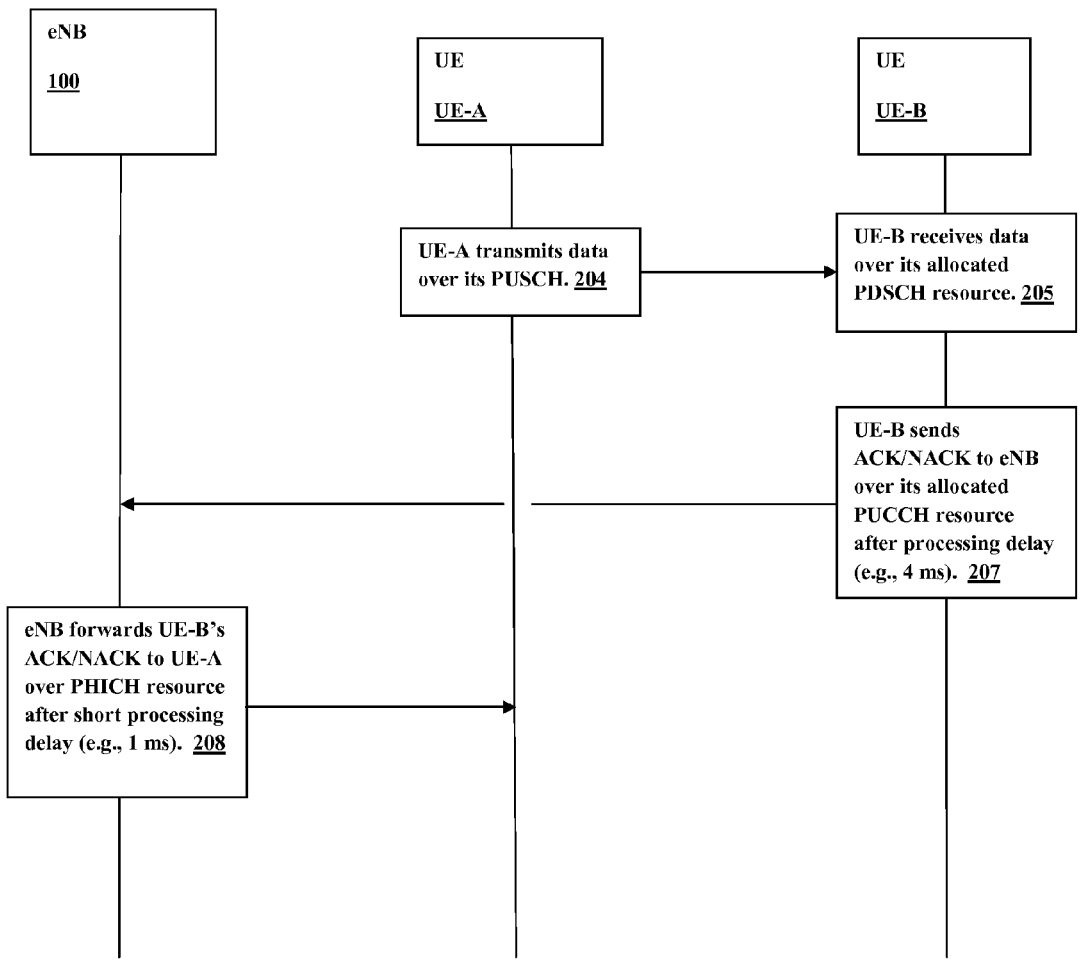
FIG. 4 illustrates an example scheme for implementing a HARQ process during D2D communications.

FIG. 4 illustrates an example scheme as executed by the eNB and UEs UE-A and UE-B. As in FIG. 2, UE-A transmits data over its allocated PUSCH at stage 204, and UE-B receives the data over its allocated PDSCH at stage 206. UE-B sends ACK/NACK to eNB over its allocated PUCCH resource after processing delay (e.g., 4 ms) at stage 207. The eNB then forwards UE-B's ACK/NACK to UE-A over PHICH resource after a short processing delay (e.g., 1 ms). UE-A may also accelerate its processing of the forwarded ACK/NACK in order to respond in time to maintain the 8 ms round trip time. For example, if the eNB forwards UE-B's NACK to UE-A 1 ms after receiving it and 5 ms after UE-B has sent it, UE-A may respond with a retransmission 3 ms later.

In another embodiment, D2D communications between UEs UE-A and UE-B are initiated by the UEs when they detect that D2D resources are available. The eNB uses a special control channel with a unique RNTI dedicated for D2D signaling. The UEs listen for this special control channel and configure themselves for direct transmission when the opportunity presents. For example, once the eNB announces a D2D resource allocation for UEs UE-A and UE-B, they proceed as follows, where UE-A has data to transmit to UE-B via a D2D link. Transmitter UE-A initiates control channel signaling towards its intended receiver UE-B using a resource allocated for that purpose. The control signaling from UE-A is transmitted at an appropriate power level (which may be indicated by the eNB via control channel signaling) and contains information identifying UE-B. Beaconing can be embedded in the control signaling to enable UE-B to measure the SINR (signal to interference plus noise ratio) and acquire other information.

Alternatively, UE-B may measure the SINR and acquire other information from reference signals with a pre-defined frequency and power that are periodically sent out by UE-A. UE-B then monitors the resource allocated for control signaling by the eNB and detects UE-A's control signal. After identifying its own ID in the signal (e.g., from the unique scrambling sequence), UE-B prepares for receiving data from UE-A. One option is to let UE-B positively acknowledge its readiness to UE-A using control signaling. UE-A then starts its data transmission using a data channel within the resource reserved by the eNB for D2D. The MCS (modulation and coding scheme) and pre-coding (antenna weighting) may be fixed based on measurement and/or feedback from either the UE or eNB. Both UE-A and UE-B then transmit and receive using the resources specified by the eNB and proceed with their respective HARQ processes.

In certain embodiments, semi-persistent scheduling can be used to reduce the amount of control signaling and minimize overhead. The eNB may schedule multiple parallel D2D pairs on the same resource for improving spatial reuse of resources. With appropriate power control, such spatial reuse will improve system throughput. The eNB may embed reference signals for UEs to use for time/frequency synchronization. The eNB may also ask UEs to send out reference signals (e.g., sounding reference signals from UE-A) for time/frequency synchronization as well as for power control. In the embodiments described above, the eNB may specify the transmission power requirement as, for example, a general threshold or a specific power level for each pair transmitted via control signaling. Relevant UEs may start transmitting on the allocated D2D resources at a power level in accordance with the requirement. This allows many parallel transmissions for maximizing spatial reuse.

Additional Notes and Examples

In Example 1, a method for operating an evolved Node B (eNB) in an LTE (Long Term Evolution) network, comprises: selecting first and second user equipments (UEs) for device-to-device (D2D) communications; allocating a D2D time-frequency resource for the first UE to transmit to the second UE; assigning the allocated D2D resource as a physical uplink shared channel (PUSCH) resource to the first UE; assigning the allocated D2D resource as a physical downlink shared channel (PDSCH) resource to the second UE; and, receiving a hybrid automatic repeat request (HARQ) ACK/NACK (positive or negative acknowledgement) from the second UE over the physical uplink control channel (PUCCH) in response to data transmitted to the second UE from the first UE.

In Example 2, the subject matter of Example 1 may optionally include receiving and decoding data transmitted to the second UE from the first UE over the first UE's PUSCH.

In Example 3, the subject matter of Example 2 may optionally include, if the data received from the first UE was decoded incorrectly, transmitting a NACK to the first UE via the physical HARQ indicator channel (PHICH) to indicate to the first UE that the data should be re-transmitted.

In Example 4, the subject matter of Example 2 may optionally include, if the data received from the first UE was decoded correctly, transmitting an ACK to the first UE via the physical HARQ indicator channel (PHICH) with no resource allocation for further transmission to indicate to the first UE that its transmission buffer should not be flushed.

In Example 5, the subject matter of Example 4 may optionally include, if a NACK has been received from the second UE, transmitting a resource allocation in the PDCCH to the first UE for further transmission over the PUSCH with a NewData bit not toggled to indicate that the data should be retransmitted in a subsequent subframe.

In Example 6, the subject matter of Example 4 may optionally include, if an ACK has been received from the second UE and if the first UE has more data to send, transmitting a resource allocation in PDCCH to the first UE for further transmission over the PUSCH with a NewData bit toggled to indicate that new data should be transmitted in a subsequent subframe.

In Example 7, the subject matter of Example 1 may optionally include forwarding the ACK/NACK received from the second UE to the first UE after a processing delay.

In Example 8, the subject matter of Example 7 may optionally include wherein the processing delay is less than 4 milliseconds.

In Example 9, the subject matter of Example 7 may optionally include wherein the ACK/NACK is forwarded to the first UE via the PHICH.

In Example 10, the subject matters of any of Examples 1 through 6 may optionally include transmitting to the second UE information about the first UE's scrambling sequence to enable the second UE to decode the first UE's transmitted data.

In Example 11, the subject matter of Example 10 may optionally include transmitting the first UE's RNTI (radio network temporary identity) to the second UE via a PDCCH (physical downlink control channel) resource.

In Example 12, the subject matters of any of Examples 1 through 6 may optionally include allocating D2D resources on a semi-persistent basis to the first and second UEs.

In Example 13, the subject matters of any of Examples 1 through 12 may optionally include transmitting a power level to the first and second UEs to be used for their transmissions.

In Example 14, a user equipment (UE) device comprises: a radio transceiver to provide an air interface for communicating with an eNB (evolved node B) and for D2D (device-to-device) communications; and processing circuitry connected to the radio transceiver to: detect if D2D resources have been made available by the eNB; if D2D resources are available, transmit control channel signaling to an intended D2D receiver UE using the available D2D resources; and, after receiving control signaling from the receiver UE indicating its readiness to receive data, transmit data to the receiver UE using the available D2D resources.

In Example 15, the subject matter of Example 14 may optionally include wherein the processing circuitry is such that the control channel signaling transmitted to the intended D2D receiver UE is transmitted at a power level indicated by the eNB via control channel signaling.

In Example 16, the subject matter of Example 14 may optionally include wherein the processing circuitry is to detect if D2D resources have been made available by the eNB using a separate control channel with a unique RNTI (radio network temporary identifier) dedicated for D2D signaling.

In Example 17, the subject matter of Example 14 may optionally include wherein the processing circuitry is to receive reference signals from the eNB for time and frequency synchronization.

In Example 18, a method for operating an evolved Node B (eNB) in an LTE (Long Term Evolution) network, comprises: making particular time-frequency resources available for device-to-device (D2D) communications, referred to as D2D resources; and, transmitting an indication of the available D2D resources to user equipments (UEs) via a separate control channel with a unique RNTI (radio network temporary identifier) dedicated for D2D signaling.

In Example 19, the subject matter of Example 18 may optionally include transmitting an indication via control signaling of a specified power level that should be used by UEs in transmitting over the D2D resources.

In Example 20, the subject matter of Example 19 may optionally include transmitting reference signals for time and frequency synchronization via control signaling to UEs utilizing the D2D resources.

In Example 21, an eNB is equipped with processing circuitry to perform any of the methods of Examples 1 through 13 or any of the methods of Examples 18-20.

In Example 22, a method for operating a UE may include the subject matters of any of Examples 14-17.

The embodiments as described above may be implemented as methods for operation and/or in various hardware configurations that may include a processor for executing instructions that perform the methods. Such instructions may be contained in a suitable storage medium from which they are transferred to a memory or other processor-executable medium.

The subject matter has been described in the context of an LTE network. Except where inconsistencies would arise, the subject matter could be used in other types of cellular networks with references to a UE and eNB replaced by references to a terminal and base station, respectively.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for operating an evolved Node B (eNB) in an LTE (Long Term Evolution) network, comprising:
   selecting first and second user equipments (UEs) for device-to-device (D2D) communications;
   allocating a D2D time-frequency resource for the first UE to transmit to the second UE;
   assigning the allocated D2D resource as a physical uplink shared channel (PUSCH) resource to the first UE;
   assigning the allocated D2D resource as a physical downlink shared channel (PDSCH) resource to the second UE;
   receiving a hybrid automatic repeat request (HARQ) ACK/NACK (positive or negative acknowledgement) from the second UE over the physical uplink control channel (PUCCH) in response to data transmitted to the second UE from the first UE over the allocated D2D resources;
   receiving and decoding the data transmitted to the second UE from the first UE over the first UE's PUSCH;
   if the data received from the first UE is decoded correctly by the eNB and an ACK is received from the second UE, sending an ACK to the first UE; and,
   if either the data received from the first UE is decoded incorrectly by the eNB or a NACK is received from the second UE, sending a NACK to the first UE.

2. The method of claim 1 further comprising, if the data received from the first UE was decoded incorrectly, transmitting a NACK to the first UE via the physical HARQ indicator channel (PHICH) to indicate to the first UE that the data should be re-transmitted.

3. The method of claim 1 further comprising, if the data received from the first UE was decoded correctly, transmitting an ACK to the first UE via the physical HARQ indicator channel (PHICH) with no resource allocation for further transmission to indicate to the first UE that its transmission buffer should not be flushed.

4. The method of claim 3 further comprising, if a NACK has been received from the second UE, transmitting a resource allocation in a physical downlink control channel (PDCCH) to the first UE for further transmission over the PUSCH with a NewData bit not toggled to indicate that the data should be retransmitted in a subsequent subframe.

5. The method of claim 3 further comprising, if an ACK has been received from the second UE and if the first UE has more data to send, transmitting a resource allocation in a physical downlink control channel (PDCCH) to the first UE for further transmission over the PUSCH with a NewData bit toggled to indicate that new data should be transmitted in a subsequent subframe.

6. The method of claim 1 further comprising forwarding the ACK/NACK received from the second UE to the first UE after a processing delay.

7. The method of claim 6 wherein the processing delay is less than 4 milliseconds.

8. The method of claim 6 wherein the ACK/NACK is forwarded to the first UE via a physical HARQ indicator channel (PHICH).

9. The method of claim 1 further comprising transmitting to the second UE information about the first UE's scrambling sequence to enable the second UE to decode the first UE's transmitted data.

10. The method of claim 9 further comprising transmitting the first UE's RNTI (radio network temporary identity) to the second UE via a PDCCH (physical downlink control channel) resource.

11. The method of claim 1 further comprising allocating D2D resources on a semi-persistent basis to the first and second UEs.

12. The method of claim 1 further comprising transmitting a power level to the first and second UEs to be used for their transmissions.

13. An apparatus for an evolved Node B (eNB), comprising:
a radio transceiver; and,
processing circuitry to:
selected fist and second user equipments (UEs for device-to-device (D2D) communications;
allocate a D2D time-frequency resource for the first UE to transmit to the second UE;
assign the allocated D2 resources as a physical uplink shared channel (PUSCH) resources to the first UE;
assign the allocated D2D resources as a physical downlink shared channel (PDSCH) resource to the second UE;
receive a hybrid automatic repeat request (HARQ) ACK/NACK (positive or negative acknowledgement) from the second UE over the physical uplink control channel (PUCCH) in response to data transmitted to the second UE from the first UE over the allocated D2D resources;
receive and decode the data transmitted to the second UE from the first UE over the first UE's PUSCH;
if the data received from the first UE is decoded correctly by the eNB and an ACK is received from the second UE, send an ACK to the first UE; and,
if either the data received from the first UE is decoded incorrectly by the eNB or a NACK is received from the second UE, send a NACK to the first UE.

14. The apparatus of claim 13 wherein the processing circuitry is further to, if the data received from the first UE was decoded incorrectly, transmit a NACK to the fist UE via the physical HARQ indicator channel (PHICH) to indicate to the first UE that the data should be re-transmitted.

15. The apparatus of claim 13 wherein the processing circuitry is further to, if the data received from the first UE was decoded correctly, transmit an ACK to the first UE via the physical HARQ indicator channel (PHICH) with no resources allocation for further transmission to indicate to the first UE that its transmission buffer should not be flushed.

16. The apparatus of claim 15 wherein the processing circuitry is further to, if a NACK has been received form the second UE, transmitting a resource allocation in a physical downlink control channel (PDCCH) to the first UE for further transmission over the PUSCH with a NewData bit not toggled to indicate that the data should be transmitted in a subsequent subframe.

17. A non-tansitory computer-readable medium comprising instructions to cause an evolved Node B (eNB), upon execution of the instructions by processing circuitry of the eNB, to:
select first and second user equipments (UEs) for device-to-device (D2D) communications;
allocate a D2D time-frequency resource for the first UE to transmit to the second UE;
assign the allocated D2D resource as a physical uplink shared channel (PUSCH) resource to the first UE;
assign the allocated D2D resource as a physical downlink shared channel (PDSCH) resource to the second UE;
receive a hybrid automatic repeat request (HARQ) aCK/NACK (positive or negative acknowledgement) from the second UE over the physical uplink control channel (PUCCH) in response to data transmitted to the second UE from the first UE over the allocated D2D resource;
receive and decode the data transmitted to the second UE from the first UE over the first UE's PUSCH;
if the data received from the fist UE is decoded correctly by the eNB and an ACK is received from the second UE, send an ACK to the first UE; and,
if either the data received from the first UE is decoded incorrectly by the eNB or a NACK is received from the second UE, send a NACK to the first UE.

18. the medium of claim 17 further comprising instructions to, if the data received from the fist UE was decoded incorrectly, transmit a NACK to the first UE via the physical HARQ indicator channel (PHICH) to indicate to the first UE that the data should be re-transmitted.

19. The medium of claim 17 further comprising instructions to, if the data received from the first UE was decoded correctly, transmit an ACK to the first UE via the physical HARQ indicator channel (PHICH) with no resource allocation for further transmission to indicate to the fist UE that its transmission buffer should not be flushed.

20. The medium of claim 19 further comprising instructions to, if a NACK has been received from the second UE, transmitting a resource allocation in a physical downlink control channel (PDCCH) to the first UE for further transmission over the PUSCH with a NewData bit not toggled to indicate that the data should be retransmitted in a subsequent subframe.

* * * * *